United States Patent [19]

Hoffman

[11] 4,121,860
[45] Oct. 24, 1978

[54] BELLOWS WITH ROTATIONAL JOINTS

[75] Inventor: Paul Leslie Hoffman, Stratford, Conn.

[73] Assignee: Avco Corporation, Wilmington, Mass.

[21] Appl. No.: 801,419

[22] Filed: May 27, 1977

[51] Int. Cl.² ............................................. F16L 21/00
[52] U.S. Cl. ..................................... 285/226; 285/331; 285/286
[58] Field of Search .............. 285/226, 299, 364, 363, 285/300, 301, 187, 228, 331, 405, 227, 286

[56] References Cited

U.S. PATENT DOCUMENTS

| 2,712,456 | 7/1955 | McCreery | 285/226 X |
| 3,574,354 | 4/1971 | Mischel | 285/226 X |
| 3,647,246 | 3/1972 | Burtis | 285/227 X |
| 3,692,337 | 9/1972 | Mischel | 285/226 |

FOREIGN PATENT DOCUMENTS

| 834,544 | 6/1956 | Fed. Rep. of Germany | 285/226 |
| 1,060,186 | 3/1954 | France | 285/226 |
| 1,279,371 | 11/1961 | France | 285/226 |
| 402,442 | 3/1943 | Italy | 285/90 |

*Primary Examiner*—Werner H. Schroeder
*Assistant Examiner*—C. J. Arbes
*Attorney, Agent, or Firm*—Ralph D. Gelling

[57] ABSTRACT

A heat suppressor for a gas turbine engine is mounted on an aircraft by means separate from the engine mounts. A sleeve apparatus is needed to connect the exhaust duct of the engine to the suppressor duct for continuous flow of turbine gases. The sleeve apparatus is in the form of a bellows to absorb bending forces created by flexing of the air frame. This invention provides a unique connecting assembly to connect the bellows to the engine. The assembly consists of an annular socket fixed to the bellows and constructed to receive a radially extending flange on a connecting shroud fixed to the engine. The flange and socket are slidably engaged to allow twisting movement between the bellows and the engine, while the bellows allows relative displacement of the axes of the connecting passages.

3 Claims, 2 Drawing Figures

BELLOWS WITH ROTATIONAL JOINTS

BACKGROUND OF THE INVENTION

As a defense against anti-aircraft missiles which are guided by a heat sensing control system, heat suppressing assemblies are connected to the exhaust of the gas turbine engine to mask the exhaust plume. These assemblies are generally mounted separately on the air frame because of their size. Because of the different mounting structures of the engine and suppressor, any distortion of the air frame will result in relative movement between the two assemblies. The suppressor assembly is generally connected to the engine exhaust by a shroud which is fixed to the engine and connected to the suppressor inlet by means of a pair of thin steel bellows. These bellows provide a resilient connection and will absorb the bending motion between the engine and suppressor assemblies whle providing a continuous passage for airflow.

Although the dual bellows are effective in absorbing some of the relative motion between the engine and suppressor, it requires a substantial length; for example, 10 or more inches and this space may not be available under all circumstances. In addition, the bellows connection is limited in its ability to absorb tortional displacement.

It is, therefore, the object of this invention to provide an improved device for connecting the engine exhaust to the suppressor assembly and to absorb bending, parallel displacement (offset), twisting, and axial displacement between the two members.

SUMMARY OF THE INVENTION

A heat suppressor duct is connected to the exhaust duct of a gas turbine engine while the engine and suppressor assemblies are independently mounted to the air frame. Because of this independent mounting, the two assemblies will have relative movement caused by flexing and vibrational distortion of the air frame. In order to connect the two ducts of the assemblies, a special bellows unit is constructed. This apparatus consists of a connecting shroud attached to the turbine housing extension of the engine. The connecting shroud is constructed with an annular radially extending flange. A stainless steel bellows is fixed to the suppressor assembly and extends forward toward the turbine exhaust. The bellows is provided with a forward annular socket which is constructed to receive the radially extending flange of the connecting shroud. A preloaded annular ring is provided to engage the connecting shroud flange to provide an effective seal for the joint. In this manner the engine and suppressor assemblies are interconnected in a manner which provides for relative tortional and offset displacement as well as axial and bending displacement.

DESCRIPTION OF THE DRAWING

The subject invention is described in more detail below with reference to the attached drawing and in the drawing.

DETAILED DESCRIPTION OF THE PREFERRED EMBODIMENT

Figure 1:
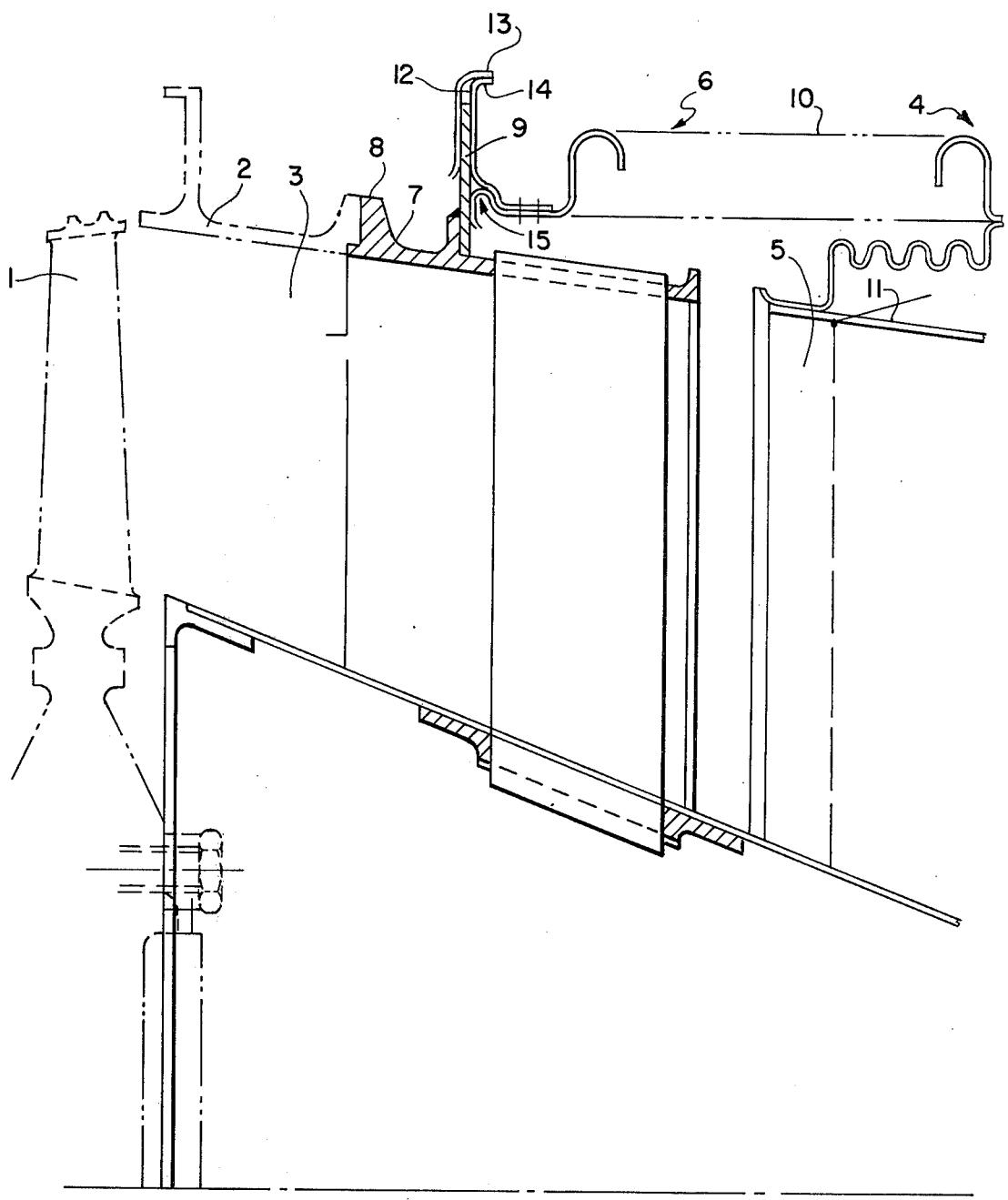
FIG. 1 is an axial cross sectional view of the upper half of the connection between the heat suppressor and the engine exhaust.
Figure 2:
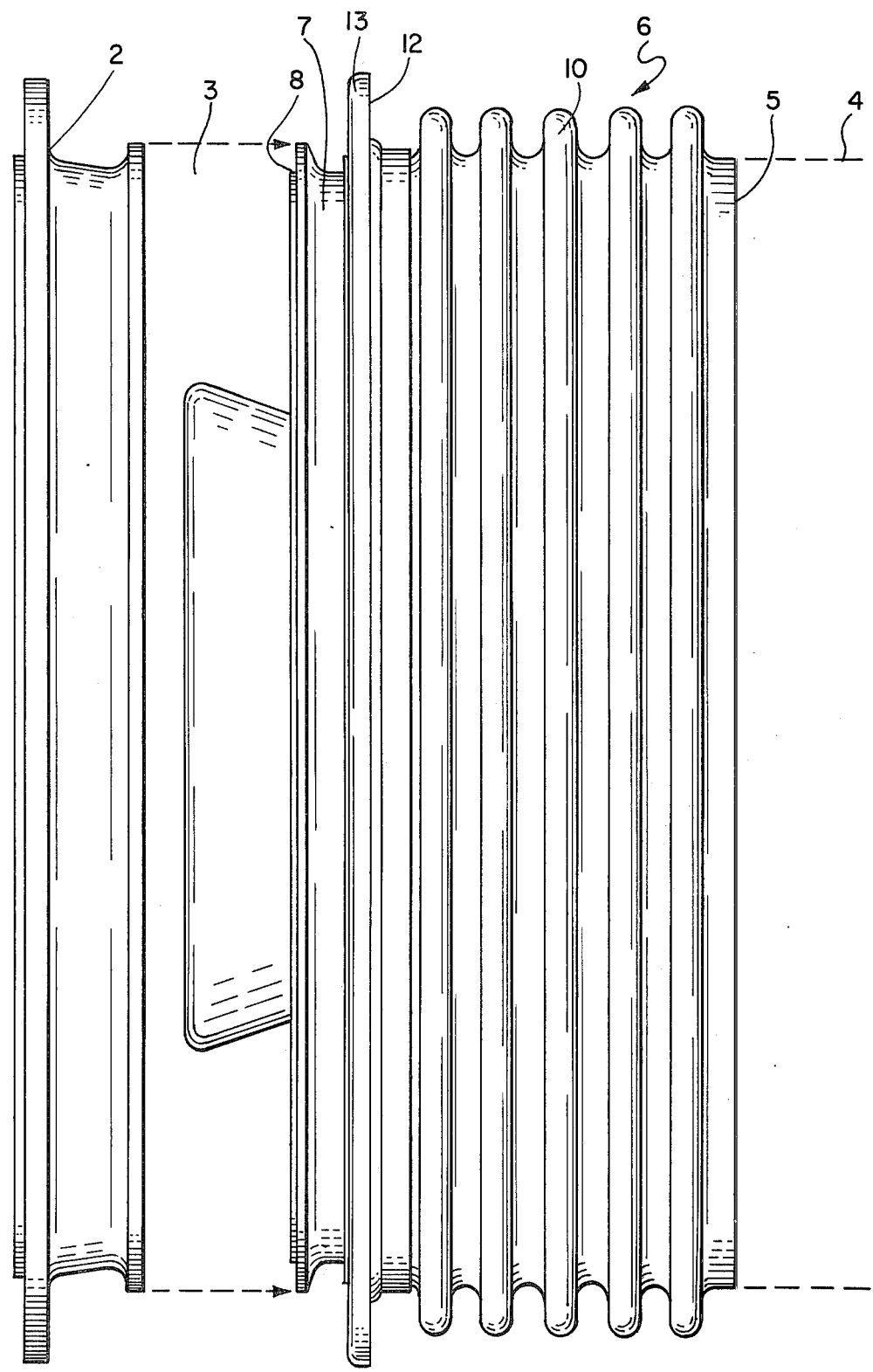
FIG. 2 is a side view of the exhaust system of a gas turbine engine employing the subject invention.

As shown in FIG. 1, a gas turbine engine is provided with a turbine blade 1 which is mounted for a rotary movement in a cylindrical turbine housing 2. The housing 2 extends rearward to provide an exhaust duct 3 for the gas turbine engine. A heat suppressor 4 is separately mounted on the aircraft and is provided with a duct 5 adapted to receive the exhaust gases from the engine. Because of the relative movement between the engine and the heat suppressor 4 which results from flexing of the air frame, a special resilient connecting assembly 6 is required.

The connecting assembly 6 consists of a cylindrical connecting shroud 7 which is constructed to be clamped to the extension of the turbine housing 2 at joint 8. A flange 9 extends radially outward from the connecting shroud 7. A resilient cylindrical bellows element 10 is fixed to the suppressor housing 11 and extends forward therefrom. The cylindrical bellows 10 may be formed of thin stainless steel. An annular socket 12 is formed at the forward portion of the cylindrical bellows 10. The annular socket 12 is constructed to receive the radially extending flange 9 of the connecting shroud 7. The socket may be formed by welding two substantially disc shaped steel flange elements 13 and 14 together. A spring member 15 may be welded to the socket flange element 14 to engage the connecting shroud flange 9 and seal the interior of the cylindrical bellows 10 to prevent the escape of exhaust gases at the point of connection. The socket 12 is constructed slightly oversized to allow for movement of the connecting shroud flange 9 within the annular socket.

In this manner a connecting device is constructed which will allow relative displacement between the suppressor assembly and the turbine housing. This displacement may take many different forms and is not limited to axial displacement. The combination of socket and bellows elements provides for the absorption of tortional, bending, offset displacement, and axial displacement between the suppressor and engine assemblies and results in a substantial improvement over the fixed bellows of the prior art.

According to the above description, the following invention is claimed as novel and is desired to be secured by Letters Patent of the United States:

1. A device for interconnecting first and second ducts which are defined respectively by first and second housings wherein the housings are subjected to relative movement comprising:

a substantially cylindrical shroud attached to the first housing and having an annular flange extending radially outward; said shroud having a connecting duct formed therein;

a resilient cylindrical bellows shaped member, having a connecting duct formed therein, attached to the second housing, said bellows member having an end portion extending toward the first housing;

a connecting element fixed to the bellows at the end portion extending toward the first housing, having an annular socket constructed therein to receive the shroud flange in sliding engagement, thereby forming a continuous connecting duct between the bellows and the shroud and interconnecting the first and second ducts while allowing for relative rotational movement between the housings.

2. A device as described in claim 1 for interconnecting first and second ducts which are defined respectively by first and second housings, said housings being subjected to relative movement further comprising:
 a cylindrical spring element mounted on the connecting flange to forcibly engage the shroud flange to seal the connecting duct when the annular flange and socket are in sliding engagement.

3. A device as described in claim 1 for interconnecting first and second ducts which are defined respectively by first and second housings, said housings being subjected to relative movement wherein the connecting element comprises:
 a pair of disc shaped flanges welded together to define an annular socket, one of said flanges having an extension toward the second housing for attachment to the bellows.

* * * * *